(12) United States Patent
Suzuki et al.

(10) Patent No.: US 11,640,089 B2
(45) Date of Patent: May 2, 2023

(54) LIQUID CRYSTAL DISPLAY DEVICE AND DISPLAY SYSTEM

(71) Applicant: SHARP KABUSHIKI KAISHA, Sakai (JP)

(72) Inventors: Shogo Suzuki, Sakai (JP); Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 21 days.

(21) Appl. No.: 17/404,663

(22) Filed: Aug. 17, 2021

(65) Prior Publication Data

US 2022/0057682 A1 Feb. 24, 2022

Related U.S. Application Data

(60) Provisional application No. 63/068,711, filed on Aug. 21, 2020.

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136213* (2013.01); *G02F 2203/30* (2013.01); *G02F 2203/64* (2013.01); *G02F 2203/66* (2013.01)

(58) Field of Classification Search
CPC ............. G02F 1/1368; G02F 1/1362; G02F 1/136286; G02F 1/136213; G02F 2203/30
See application file for complete search history.

(56) References Cited

U.S. PATENT DOCUMENTS

| | | | |
|---|---|---|---|
| 2006/0268203 A1 | 11/2006 | Kurahashi et al. | |
| 2007/0252928 A1* | 11/2007 | Ito | G02F 1/1362 349/113 |
| 2015/0293546 A1* | 10/2015 | Tanaka | G02F 1/136227 327/541 |
| 2017/0351152 A1* | 12/2017 | Hashiguchi | G02F 1/1345 |
| 2018/0231837 A1 | 8/2018 | Fukuoka et al. | |
| 2019/0163024 A1* | 5/2019 | Tominaga | G02F 1/134309 |
| 2020/0117063 A1* | 4/2020 | Sugimoto | G02F 1/136227 |

FOREIGN PATENT DOCUMENTS

| | | | |
|---|---|---|---|
| CN | 107065362 A | * | 8/2017 |
| JP | 2006-330610 A | | 12/2006 |
| JP | 2009-103866 A | | 5/2009 |
| JP | 2009103866 A | * | 5/2009 |
| WO | 2016/056298 A1 | | 4/2016 |

OTHER PUBLICATIONS

English translation for CN-107065362-A, Du (Year: 2017).*
English translation for JP-2009103866-A, Hamagishi (Year: 2009).*

* cited by examiner

*Primary Examiner* — Jonathan Y Jung
(74) *Attorney, Agent, or Firm* — ScienBiziP, P.C.

(57) ABSTRACT

A liquid crystal display device comprises a first substrate; a second substrate opposite the first substrate; a liquid crystal layer between the first substrate and the second substrate; and an active area including: a matrix of first regions; and a plurality of second regions distributed so as not to overlap the first regions, wherein each first region includes a switching element and is supplied with a grayscale signal via the switching element, and the plurality of second regions includes no switching element and is supplied with a common signal.

15 Claims, 10 Drawing Sheets

VIEWER SIDE    REAR SIDE

LIQUID CRYSTAL DISPLAY DEVICE AND DISPLAY SYSTEM

CROSS-REFERENCE TO RELATED APPLICATION

The present application claims priority from Provisional Application No. 63/068,711, the content to which is hereby incorporated by reference into this application.

BACKGROUND

1. Field

The disclosure relates to liquid crystal display devices and display systems.

2. Description of the Related Art

Liquid crystal display devices are used for various uses. Technology has been studied to develop a see-through display device both serving as a liquid crystal display device for image displays and allowing the viewer to see, for example, scenery behind the liquid crystal display device.

As an example, PCT International Application Publication No. WO2016/056298 discloses a see-through display device including a light-guide plate on which dot patterns are printed to improve the luminance of the light passing through the image display area of the liquid crystal panel.

As another example, Japanese Unexamined Patent Application Publication, Tokukai, No. 2009-103866 discloses a three-dimensional display device including a stack of display panels. A plurality of colorless and transparent light-passing sections with no color filters is provided in the display area of the display panel provided opposite from the viewer in the rear of the display device.

In relation to the three-dimensional display device, Japanese Unexamined Patent Application Publication, Tokukai, No. 2006-330610 further discloses that a plurality of pixels with a high-transmittance, white color filter is provided in the display area of the display panel provided opposite from the viewer in the rear of the display device.

SUMMARY

See-through display devices require a high optical transmittance (hereinafter, simply "transmittance"). It is however difficult to obtain a high transmittance because the transmittance if a liquid crystal panel is generally dictated, for example, by the aperture ratio, which is dependent primarily on the wiring, as well as by the transmittance of various components such as the liquid crystal, the color filters, the thin film transistors, and the polarizers. The color filters and polarizers have low transmittance. Some liquid crystal materials exhibit low transmission efficiency under applied voltage. In particular, high-resolution models suffer from low aperture ratio due to the wiring thereof.

PCT International Application Publication No. WO2016/056298 takes particular note of light-guide plates and scattering films, but does not describe the structure of the liquid crystal panel, especially, the structure of the array substrate. PCT International Application Publication No. WO2016/056298 fails to disclose a specific technique of achieving a high aperture ratio.

Japanese Unexamined Patent Application Publication, Tokukai, No. 2009-103866 provides high-transmittance light-passing sections by eliminating color filters, but does not describe a specific array substrate in relation to increases in aperture ratio. When the display device includes no color filters as a prerequisite, in other words, when the display device includes no color filters across the entire active area, the light-passing sections do not contribute to the improvement of transmittance.

Japanese Unexamined Patent Application Publication, Tokukai, No. 2006-330610 also fails to give a specific description of an array substrate in relation to increases in aperture ratio.

The disclosure has been made in view of these issues and has an object to provide a liquid crystal display device capable of serving as a see-through display device through which the background scenery is readily visible owing to increased aperture ratio thereof and also to provide a display system in which the displays produced by a display device provided in the rear of the system are readily visible through the see-through display device.

(1) The disclosure, in an embodiment thereof, is directed to a liquid crystal display device including: a first substrate; a second substrate opposite the first substrate; a liquid crystal layer between the first substrate and the second substrate; and an active area including: a matrix of first regions; and a plurality of second regions distributed so as not to overlap the first regions, wherein each first region includes a switching element and is supplied with a grayscale signal via the switching element, and the plurality of second regions includes no switching element and is supplied with a common signal.

(2) In another embodiment of the disclosure, the liquid crystal display device of item (1) may be configured such that each first region includes a pixel electrode connected to the switching element in that first region, each of the plurality of second regions includes a transparent electrode, and the liquid crystal display device further includes: an opposite electrode opposite the pixel electrodes and the transparent electrodes; a plurality of data lines extending in a column direction and connected to the respective switching elements to supply a grayscale signal to the first regions; a plurality of scan lines extending in a row direction and connected to the respective switching elements; and a plurality of auxiliary capacitor lines extending in the row direction and supplied with a signal of a substantially same potential as the opposite electrode.

(3) In another embodiment of the disclosure, the liquid crystal display device of item (2) may be configured such that each of the plurality of auxiliary capacitor lines overlaps at least one of the first regions and at least one of the plurality of second regions, and the plurality of auxiliary capacitor lines occupies a smaller area in those of the plurality of second regions which are overlapped by the plurality of auxiliary capacitor lines than the plurality of auxiliary capacitor lines occupies an area in those first regions which are overlapped by the plurality of auxiliary capacitor lines.

(4) In another embodiment of the disclosure, the liquid crystal display device of item (2) or (3) may be configured such that each transparent electrode is connected to at least one of the plurality of auxiliary capacitor lines via no switching element.

(5) In another embodiment of the disclosure, the liquid crystal display device of item (2), (3), or (4) may be configured such that the first regions are staggered, and those switching elements which are associated with those first regions which reside in two adjacent columns are connected to one of the plurality of data lines.

(6) In another embodiment of the disclosure, the liquid crystal display device of item (5) may be configured so as to further include a plurality of dummy data lines extending in the column direction, wherein the plurality of data lines and the plurality of dummy data lines alternate when traced along the row direction.

(7) In another embodiment of the disclosure, the liquid crystal display device of item (6) may be configured such that each transparent electrode is connected to at least one of the plurality of auxiliary capacitor lines and at least one of the plurality of dummy data lines via no switching element.

(8) In another embodiment of the disclosure, the liquid crystal display device of item (2) or (3) may be configured such that the first regions are staggered, those switching elements which are associated with those first regions which reside in two adjacent columns are connected to one of the plurality of data lines, the liquid crystal display device further includes a plurality of dummy data lines extending in the column direction, the plurality of data lines and the plurality of dummy data lines alternate when traced along the row direction, and each transparent electrode is connected to none of the plurality of auxiliary capacitor lines and to at least one of the plurality of dummy data lines via no switching element.

(9) In another embodiment of the disclosure, the liquid crystal display device of item (2), (3), or (4) may be configured such that the first regions are staggered, and those switching elements which are associated with those first regions which reside in two adjacent rows are connected to one of the plurality of scan lines.

(10) In another embodiment of the disclosure, the liquid crystal display device of item (9) may be configured so as to further include a plurality of dummy scan lines extending in the row direction, wherein the plurality of scan lines and the plurality of dummy scan lines alternate when traced along the column direction.

(11) In another embodiment of the disclosure, the liquid crystal display device of item (9) may be configured such that each transparent electrode is connected to at least one of the plurality of auxiliary capacitor lines via no switching element.

(12) In another embodiment of the disclosure, the liquid crystal display device of item (2) or (3) may be configured such that the first regions are staggered, those switching elements which are associated with those first regions which reside in two adjacent rows are connected to one of the plurality of scan lines, the liquid crystal display device further includes a plurality of dummy scan lines extending in the row direction, the plurality of scan lines and the plurality of dummy scan lines alternate when traced along the column direction, and each transparent electrode is connected to none of the plurality of auxiliary capacitor lines and to at least one of the plurality of dummy scan lines via no switching element.

(13) In another embodiment of the disclosure, the liquid crystal display device of item (1), (2), (3), (4), (5), (6), (7), (8), (9), (10), (11), or (12) may be configured so as to operate in normally white mode.

(14) In another embodiment of the disclosure, the liquid crystal display device of item (1), (2), (3), (4), (5), (6), (7), (8), (9), (10), (11), or (12) may be configured so as to operate in normally black mode.

(15) The disclosure, in another embodiment thereof, is directed to a display system including: the liquid crystal display device of item (1), (2), (3), (4), (5), (6), (7), (8), (9), (10), (11), (12), (13), or (14); and a display device behind the liquid crystal display device.

The disclosure can provide a liquid crystal display device capable of serving as a see-through display device through which the background scenery is readily visible owing to increased aperture ratio thereof and also provide a display system in which the displays produced by a display device provided in the rear of the system are readily visible through the see-through display device.

DESCRIPTION OF EMBODIMENTS

Definition of Terms

Throughout the present specification, the "row direction" refers to the horizontal direction (X-direction) for the display screen, and the "column direction" refers to the vertical directions (Y-direction) for the display screen. In addition, the members or the segments of members (e.g., regions and pixels) that are "in a row" or "in a column" refers to a line of such members or segments arranged in the row direction or in the column direction. For instance, the "regions in two adjacent columns (or rows)" refers to the two adjacent column-wise (or row-wise) lines of regions, and the "two adjacent pixel columns (or rows)" refers to the two adjacent column-wise (or row-wise) lines of pixels.

The following will describe embodiments of the disclosure. The disclosure is not limited to the following description of embodiments and may be redesigned where appropriate in such a manner as to provide the essential features of the disclosure.

Embodiment 1

Figure 1A:
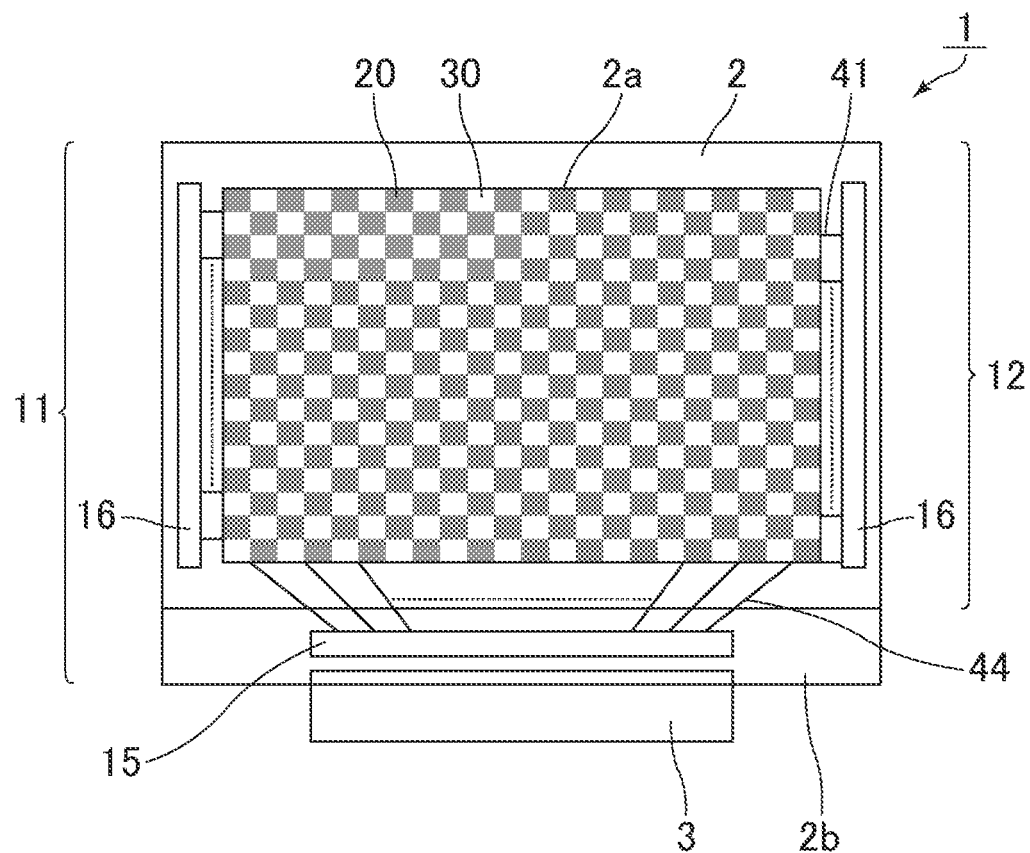
FIG. 1A is a schematic plan view of a structure of a liquid crystal display device in accordance with Embodiment 1.
Figure 1B:
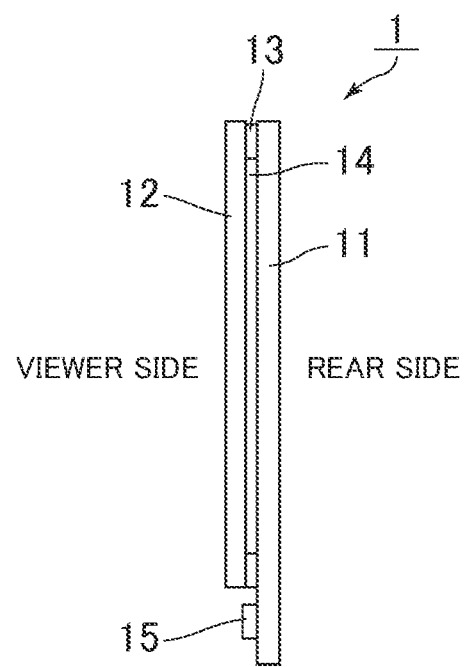
FIG. 1B is a schematic cross-sectional view of the structure of the liquid crystal display device in accordance with Embodiment 1.

FIG. 1A is a schematic plan view of a structure of a liquid crystal display device in accordance with Embodiment 1. FIG. 1B is a schematic cross-sectional view of the structure of the liquid crystal display device in accordance with Embodiment 1. Referring to FIG. 1A, a liquid crystal display device 1 in accordance with the present embodiment is a see-through display device through which the viewer can visually recognize objects behind the liquid crystal display device 1 such as another display device, a specific object, and/or scenery. The liquid crystal display device 1 includes: a liquid crystal panel 2 having an active area (image display area) 2a in which images are displayed; a FPC (flexible printed circuit board) 3 including two terminal sections one of which is connected to a terminal region 2b provided in one of two end regions of the liquid crystal panel 2; and a control board connected to the other terminal section of the FPC 3 to supply various signals to the liquid crystal panel 2.

Referring to FIGS. 1A and 1B, the liquid crystal panel 2 includes: an array substrate (first substrate) 11 including a plurality of thin film transistors (TFTs) as switching elements; an opposite substrate (second substrate) 12 opposite the array substrate 11; a sealing 13 disposed around the active area 2a to attach the array substrate 11 and the opposite substrate 12 together leaving a prescribed space therebetween; a liquid crystal layer 14 between the array substrate 11 and the opposite substrate 12; and a pair of linear polarizers, one each on the viewer and rear surfaces of the array substrate 11 and the opposite substrate 12. The terminal region 2b of the liquid crystal panel 2 resides on a part of the array substrate 11 that extends beyond the opposite substrate 12. There is provided a source driver 15 directly on the terminal region 2b. There are provided monolithic gate drivers 16 on the array substrate 11 to the left and right of the active area 2a.

Referring to FIG. 1A, the source driver 15 is connected to data lines 44. The data lines 44 extend in the column direction from the source driver 15 to the active area 2a. The gate drivers 16 are connected to scan lines 41. The scan lines 41 extend in the row direction from the gate drivers 16 to the active area 2a. The odd-numbered scan lines 41 are connected to one of the gate drivers 16, and the even-numbered scan lines 41 are connected to the other gate driver 16.

In the present embodiment, some of the "pixels" in the active area 2a are shed, so as to provide first regions 20 where pixel potentials are individually controlled and second regions 30 where pixel potential are not individually controlled. The second regions 30 may therefore have a high-transmittance structure with high aperture ratio and do not make any contribution to the production of displays. This mixed provision of the high-transmittance, second regions 30 and the low-transmittance, first regions 20 in the active area 2a enables a high transmittance. The liquid crystal display device 1 can hence serve as a see-through display device through which the viewer can visually easily and clearly recognize, for example, the background scenery behind the liquid crystal display device 1.

More particularly, the active area 2a is segmented into a matrix of regions (e.g., rows and columns of substantially square regions) to provide the first regions 20 where the voltages applied across the liquid crystal layer 14 are individually controlled and the second regions 30 where the voltages applied across the liquid crystal layer 14 are not individually controlled. Grayscale signals (video signals) are supplied to first pixel electrodes of first pixels in the first regions 20 via the TFTs connected to the scan lines 41 and the data lines 44. Meanwhile, a signal for the liquid crystal alignment at which the transmittance is practically a maximum is supplied to second pixel electrodes of second pixels in the second regions 30 (for convenience, "pixel electrodes" of "pixels" in this description).

The first regions 20 and the second regions 30 each include a pixel and a pixel electrode. The first regions 20 (first pixels) and the second regions 30 (second pixels) are arranged in a checkered pattern. In other words, the first regions 20 and the second regions 30 alternate with each other both when traced along the row direction and when traced along the column direction.

One first region 20 and one second region 30 may or may not alternate with each other. For instance, groups of first regions 20 and groups of second regions 30 may alternate with each other.

The display devices described in Patent Literature 2 and 3 include high-transmittance pixels in the rear display panel. In contrast, in the present embodiment, when there is provided another display device on the rear of the liquid crystal display device 1 as will be described later, the high-transmittance, second regions 30 (second pixels) are provided in the liquid crystal panel 2, which resides on the viewer side, not in the rear panel.

Figure 2:
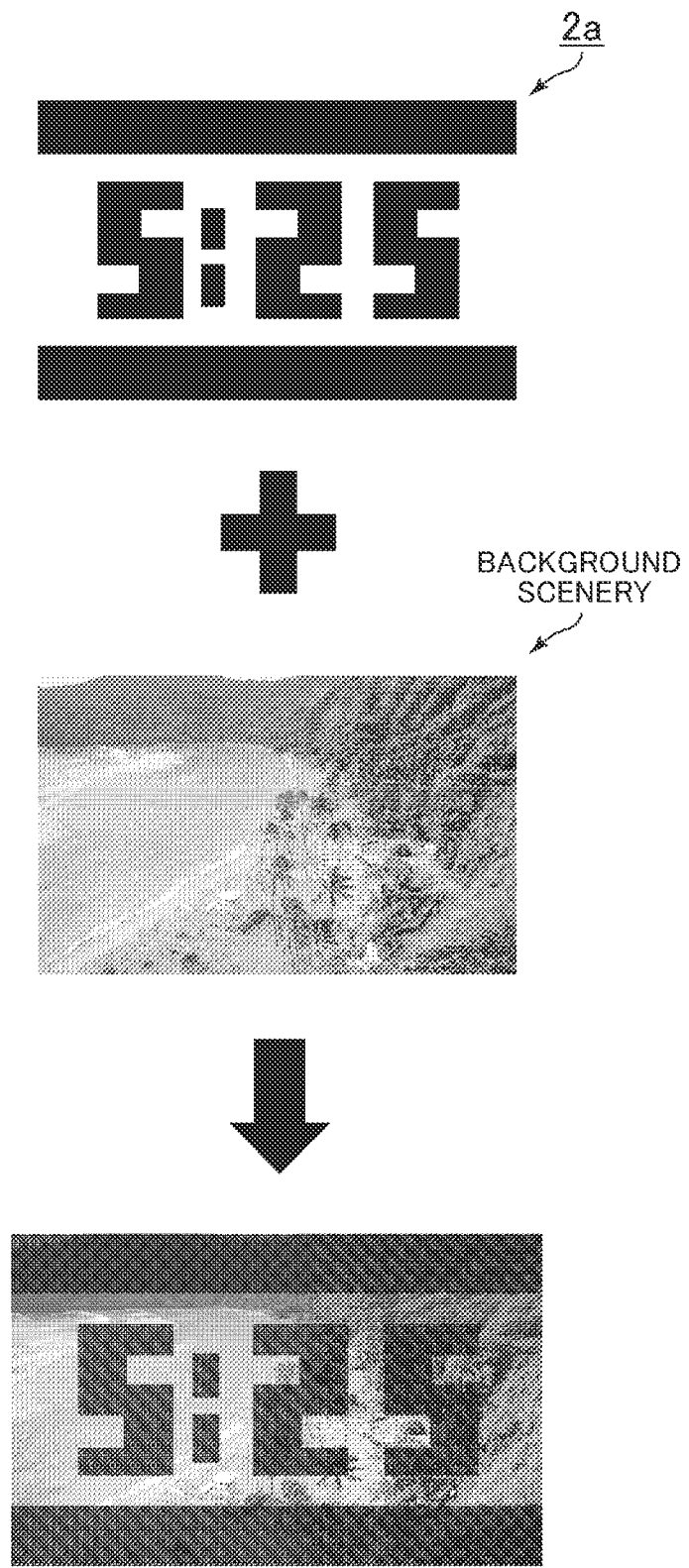
FIG. 2 is an illustration of an example of how the image produced by the liquid crystal display device in accordance with Embodiment 1 and the background scenery thereof may appear.

FIG. 2 is an illustration of an example of how the image produced by the liquid crystal display device 1 in accordance with Embodiment 1 and the background scenery thereof may appear. Referring to FIG. 2, the liquid crystal display device 1 is capable of producing desired images (still images and/or moving images) in the active area 2a. The background (e.g., scenery) of the liquid crystal display device 1 is visible through these images across the entire active area 2a.

Figure 3:
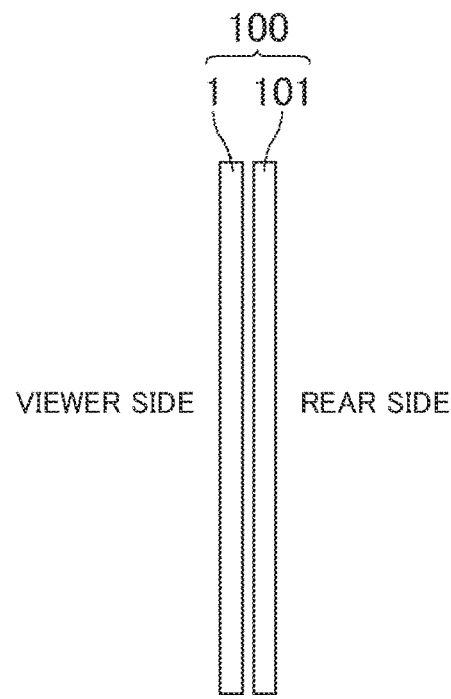
FIG. 3 is a schematic cross-sectional view of a structure of a display system in accordance with Embodiment 1.

FIG. 3 is a schematic cross-sectional view of a structure of a display system in accordance with Embodiment 1. Referring to FIG. 3, a display system 100 in accordance with the present embodiment includes: the liquid crystal display device 1 serving as a see-through display device; and a display device 101 serving as another display device disposed on the rear of the liquid crystal display device 1. In the display system 100, the desired images (still images and/or moving images) produced by the rear display device 101 are visible through the desired images (still images and/or moving images) produced in the active area 2a of the liquid crystal display device 1. In other words, the displays on the display devices 1 and 101 are superimposed and visually recognizable. The display device 101 may be of any type of display device including the liquid crystal display device and the OLED (organic light-emitting diodes) display device.

FIGS. 1A and 1B represent a structure including no backlight or color filter. Feasible examples for a full-color liquid crystal display device 1 include a structure including on the rear of the liquid crystal panel 2: a highly transparent light-guide plate; and an edge light capable of emitting red, green, and blue light by time division (field sequential drive) and a structure including color filters (e.g., red, green, and blue color filters) for the TFT-controlled, first pixels.

FIGS. 1A and 2 represent a structure where the entire active area 2a is a see-through region through which the background is visible. Alternatively, the active area 2a may include, in particular locations, such see-through regions and non-see-through regions through which the background is not visible. In other words, the active area 2a may be only partially see-through or partially non-see-through. The non-see-through regions include the first regions 20 (first pixels) and no second region 30 (second pixel).

Figure 4:
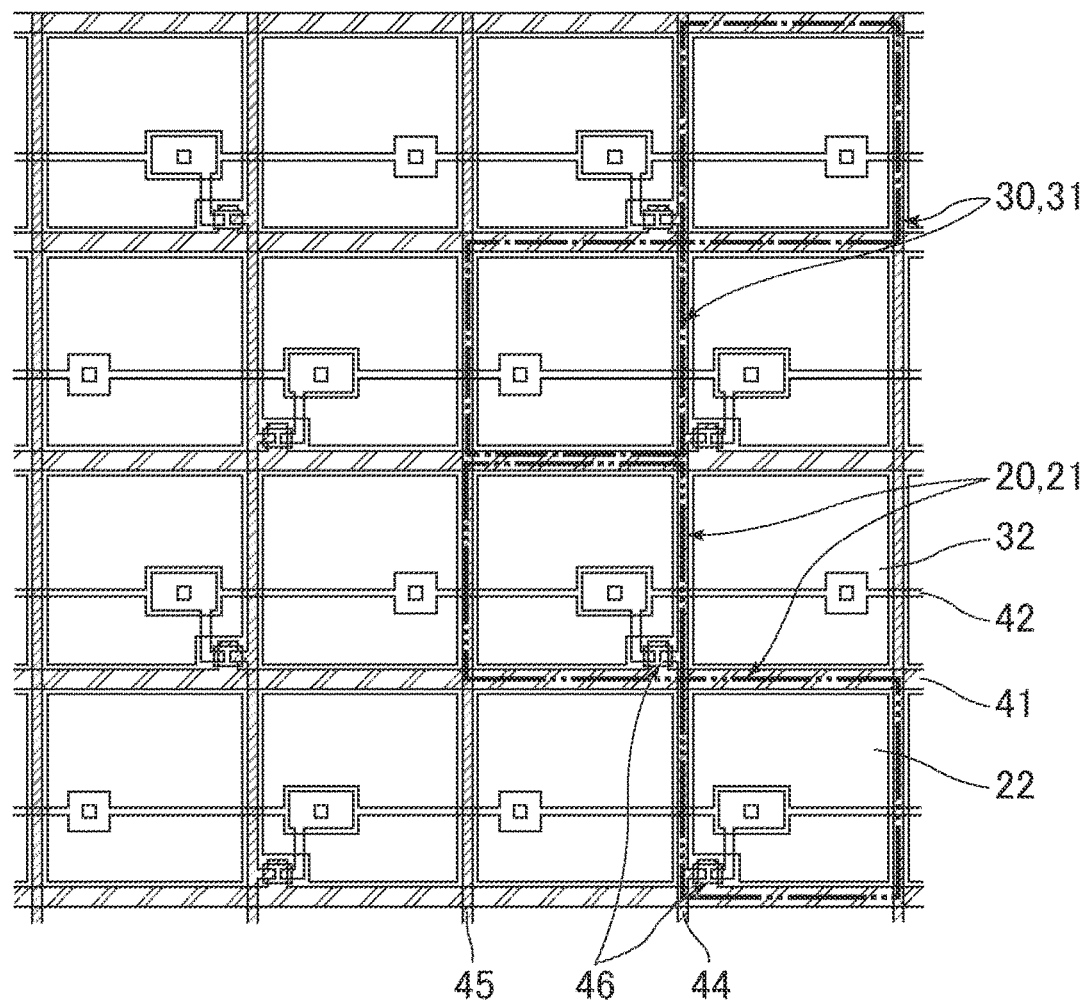
FIG. 4 is an enlarged schematic plan view of a structure of an active area of the liquid crystal display device in accordance with Embodiment 1.
Figure 5:
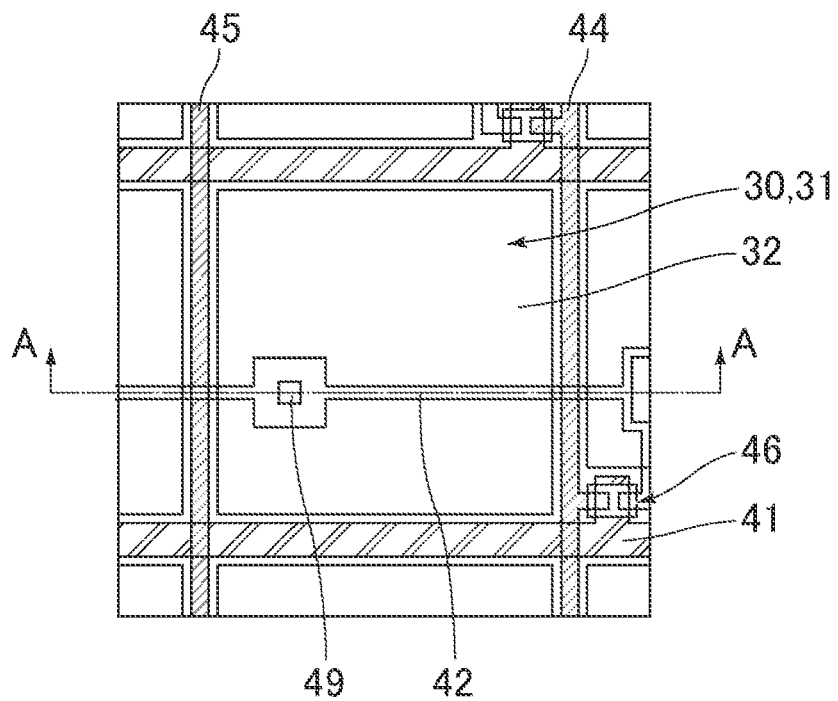
FIG. 5 is an enlarged schematic plan view of a structure of a second region in the liquid crystal display device in accordance with Embodiment 1.
Figure 6:
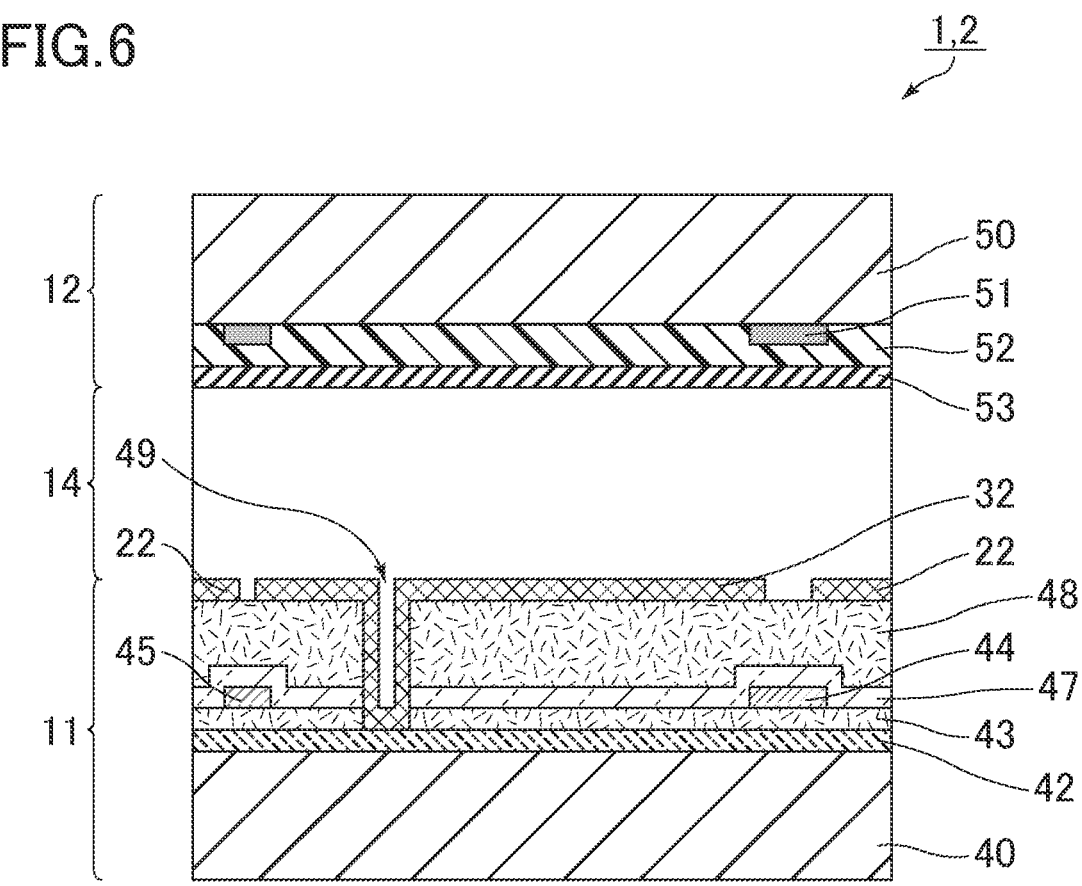
FIG. 6 is a schematic cross-sectional view taken along line A-A shown in FIG. 5.

FIG. 4 is an enlarged schematic plan view of a structure of an active area of the liquid crystal display device in accordance with Embodiment 1. FIG. 5 is an enlarged schematic plan view of a structure of a second region in the liquid crystal display device in accordance with Embodiment 1. FIG. 6 is a schematic cross-sectional view taken along line A-A shown in FIG. 5. Referring to FIGS. 4 to 6, the array substrate 11 includes the plurality of scan lines 41, a plurality of auxiliary capacitor lines (Cs signal lines) 42, the plurality of data lines 44, and a plurality of dummy data lines 45 in the active area 2a on a transparent substrate 40 such as a glass substrate. The scan lines 41 and the auxiliary capacitor lines 42 extend parallel to each other in the row direction. The data lines 44 and the dummy data lines 45 extend parallel to each other in a direction that intersects with the scan lines 41 and the auxiliary capacitor lines 42 (column direction) via a gate insulation film 43. The scan lines 41 and the auxiliary capacitor lines 42 alternate with each other when traced along the column direction. The data lines 44 and the dummy data lines 45 alternate with each other when traced along the row direction. The scan lines 41 and a combination of the data lines 44 and the dummy data lines 45 are arranged generally like a lattice so as to segment the active area 2a into squares. The first regions 20 (first pixels 21) and the second regions 30 (second pixels 31) are disposed in these line-segmented regions to form a checkered pattern. In other words, the scan lines 41 reside between column-wise adjacent pixels, and the data lines 44 and the dummy data lines 45 reside between row-wise adjacent pixels. The scan lines 41 and the auxiliary capacitor lines 42 are arranged with the same pitch as the pixels when traced along the column direction. In contrast, the data lines 44 and the dummy data lines 45 are arranged with twice as large a pitch as the pixels when traced along the row direction. The first pixels 21 (first regions 20) include TFTs 46 near the intersections of the scan lines 41 and the data lines 44. The dummy data lines 45 extend in the same layer as, and parallel to, the data lines 44 in the active area 2a. The dummy data lines 45 are supplied with different signals from the grayscale signals that are supplied to the data lines 44. The array substrate 11 includes a plurality of first pixel electrodes 22 and a plurality of second pixel electrodes 32 on an inorganic insulation film 47 and an organic insulation film (planarization film) 48. The inorganic insulation film 47 and the organic insulation film 48 cover the data lines 44 and the dummy data lines 45. The first pixel electrodes 22 and the second pixel electrodes 32 reside in the first regions 20 (first pixels 21) and the second regions 30 (second pixels 31) respectively. Each first pixel electrode 22 is connected to an associated one of the data lines 44 via an associated one of the TFTs 46 to be supplied with a grayscale signal from the data line 44 via the TFT 46.

The scan lines 41, the data lines 44, and the dummy data lines 45 are metal wiring made of a metal material. The data lines 44 and the dummy data lines 45 may be formed simultaneously by patterning a common metal film by photolithography. The auxiliary capacitor lines 42 may be metal wiring made of a metal material or transparent electrodes made of a transparent conductive material such as ITO (indium tin oxide). When the auxiliary capacitor lines 42 are metal wiring made of a metal material, the scan lines 41 and the auxiliary capacitor lines 42 may be formed simultaneously by patterning a common metal film by photolithography.

The first pixel electrodes 22 and the second pixel electrodes 32 are transparent electrodes made of a transparent conductive material such as ITO and may be formed simultaneously by patterning a common transparent conductive film by photolithography.

Each second pixel electrode 32 may be provided in the associated one of the second pixels 31 separately from the other second pixel electrodes 32 as shown in FIGS. 4 and 5. Alternatively, the second pixel electrode 32 may be provided commonly across two or more of the second pixels 31 (or commonly across all the second pixels 31).

The opposite substrate 12 includes: a black matrix (BM) 51 and a colorless and transparent organic insulation film (planarization film) 52 on a transparent substrate 50 such as a glass substrate; and an opposite electrode 53 on the organic insulation film 52.

The opposite electrode 53 is a transparent electrode made of a transparent conductive material such as ITO and provided uniformly across the entire active area 2a. The opposite electrode 53 is supplied with a COM signal that is a common signal to both the pixels 21 and 31. The opposite electrode 53 may be provided on the array substrate 11. In such cases, the opposite electrode may be provided in the same layer as the pixel electrodes 22 and 32 and may be provided on the faces of the pixel electrodes 22 and 32 facing the liquid crystal layer 14 or on the faces of the pixel electrodes 22 and 32 opposite from the liquid crystal layer 14 via an insulation film.

On the faces of the substrates 11 and 12 facing the liquid crystal layer 14 is there provided an alignment film for controlling the alignment of the liquid crystal molecules in the liquid crystal layer 14. On the faces of the substrates 11 and 12 opposite from the liquid crystal layer 14 is there provided a polarizer, for example, a linear polarizer.

The liquid crystal panel 2 may operate in normally black mode, but preferably operates in normally white mode. In such applications where the background scenery of the liquid crystal display device 1 should be hidden except in specific time periods (e.g., curtains and window shades), however, the liquid crystal panel 2 preferably operates in normally black mode. The liquid crystal layer 14, in normally white mode, has a transmittance that is a maximum (white display) in the absence of applied voltage across the liquid crystal layer 14 and that decreases with the voltage applied across the liquid crystal layer 14. Conversely, in normally black mode, the liquid crystal layer 14 has a transmittance that is a minimum (black display) in the absence of applied voltage across the liquid crystal layer 14 and that increases with the voltage applied across the liquid crystal layer 14.

The liquid crystal panel 2 may be of any type (any liquid crystal mode) of liquid crystal panel including TN (twisted nematic), ECB (electrically controlled birefringence), FFS (fringe-field switching), and VA (vertical alignment) liquid crystal panels. From the perspective of power consumption, TN and ECB liquid crystal panels in normally white mode and VA, FFS, and ECB liquid crystal panels in normally black mode are preferred. The liquid crystal mode of the liquid crystal panel 2 is preferably selected according to, for example, whether the liquid crystal display device 1 is used continuously (e.g., when used as a vehicle window) or used only in specific time periods (e.g., when used in a game console).

In the liquid crystal display device 1, the gate drivers 16 supply a scan signal sequentially to the scan lines 41, and the source driver 15 supplies a grayscale signal to the data lines 44 when the TFTs 46 are placed under applied voltage (turned on) by the scan signals, all under the control of the controller on the control board. Each first pixel electrode 22 is placed at a potential according to the grayscale signal supplied from the source driver 15 via the TFT 46 and data line 44 connected to the first pixel electrode 22. That generates an electric field (vertical electric field when the opposite electrode 53 is provided on the opposite substrate 12) between the first pixel electrode 22 and the opposite electrode 53. This electric field rotates the liquid crystal molecules in the liquid crystal layer 14. By controlling the magnitude of the voltage applied across the first pixel electrode 22 and the opposite electrode 53 in this manner, the retardation of the liquid crystal layer 14 is changed to allow or prohibit transmission of light. The grayscale signal supplied to the first pixel 21 is stored in a liquid crystal capacitor composed of the first pixel electrode 22, the liquid crystal layer 14, and the opposite electrode 53 until a next frame and is also stored in an auxiliary capacitor composed of the drain electrode of the TFT 46, the gate insulation film 43, and the auxiliary capacitor line 42.

In the present embodiment, the second pixel 31 (second region 30) includes no TFT. The second pixel electrode 32, which is a transparent electrode, and the auxiliary capacitor line 42 are connected to each other via a contact hole 49 that runs through the gate insulation film 43, the inorganic insulation film 47, and the organic insulation film 48. In normally white mode, the auxiliary capacitor line 42 is supplied with a signal (COM signal) of substantially the same potential as is the opposite electrode 53. The auxiliary capacitor line 42 occupies, in the second pixel 31, an area that is equivalent to the contact hole 49 and a minimum line width. This area is smaller than the area occupied by the auxiliary capacitor line 42 in the first pixel 21.

Since the second pixels 31 (second regions 30) with a high aperture ratio (high transmittance) and including no TFT and the auxiliary capacitor lines 42 occupying a small area are arranged in a checkered pattern as described here, the objects and scenery behind the liquid crystal display device 1 are visually recognizable more easily. In addition, since the alignment of the liquid crystal layer 14 is not changed in the second pixels 31, the transmittance can be restrained from decreasing due to the response speed of the liquid crystal.

The signal on the auxiliary capacitor line 42 is a DC signal supplied from, for example, an external source. The signal on the auxiliary capacitor line 42 is preferably set to such a fixed potential that the second pixel 31 appears white in normally white mode and black in normally black mode in the absence of applied voltage. As described above, the auxiliary capacitor line 42 is preferably supplied with a signal (COM signal) of substantially the same potential as is the opposite electrode 53. When this is the case, the auxiliary capacitor line 42 may be connected to a terminal section in the top layer of the array substrate 11, and this terminal section may be connected to the opposite electrode 53 on the opposite substrate 12 via, for example, a conduction member such as gold particles contained in the sealing 13, so that the auxiliary capacitor line 42 and the opposite electrode 53 can be supplied with a COM signal from an external source.

The TFTs 46 in the first pixels 21 (first regions 20) are staggered in the present embodiment, so that those TFTs 46 associated with two adjacent columns of pixels can be connected to the same one of the data lines 44 (one of the data lines 44 flanked by these two columns of pixels). Accordingly, there exists no data line 44 in parts of the gap separating the two adjacent columns of pixels. The dummy data line 45 may be provided in these parts where there exists no data line 44 as described above. Alternatively, the dummy data line 45 may not be provided in the parts. The parts may include wiring that has different functions than does the data line 44.

This particular structure can increase the aperture ratio of the first pixels 21 (first regions 20) and the second pixels 31 (second regions 30) over the structure where the second pixels 31 (second regions 30) are simply provided in specific regions (over the structure where the data line 44 resides in all the gaps separating adjacent columns of pixels).

The dummy data lines 45 are provided for the purpose of, for example, regulating parasitic capacitance in the pixels and shielding the gap separating adjacent pixel electrodes from light.

Figure 7:
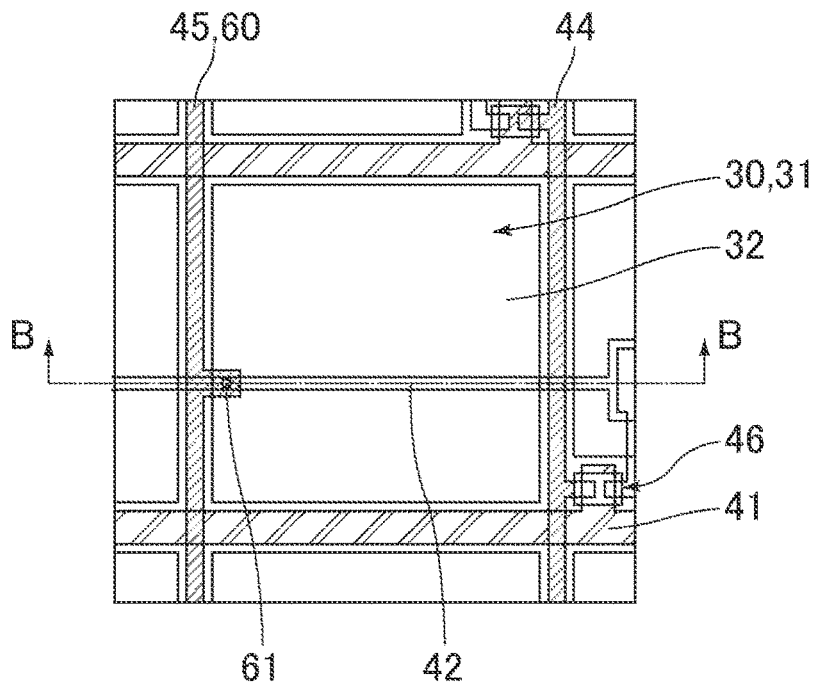
FIG. 7 is an enlarged schematic plan view of a structure of a second region in a liquid crystal display device in accordance with Variation Example 1 of Embodiment 1.
Figure 8:
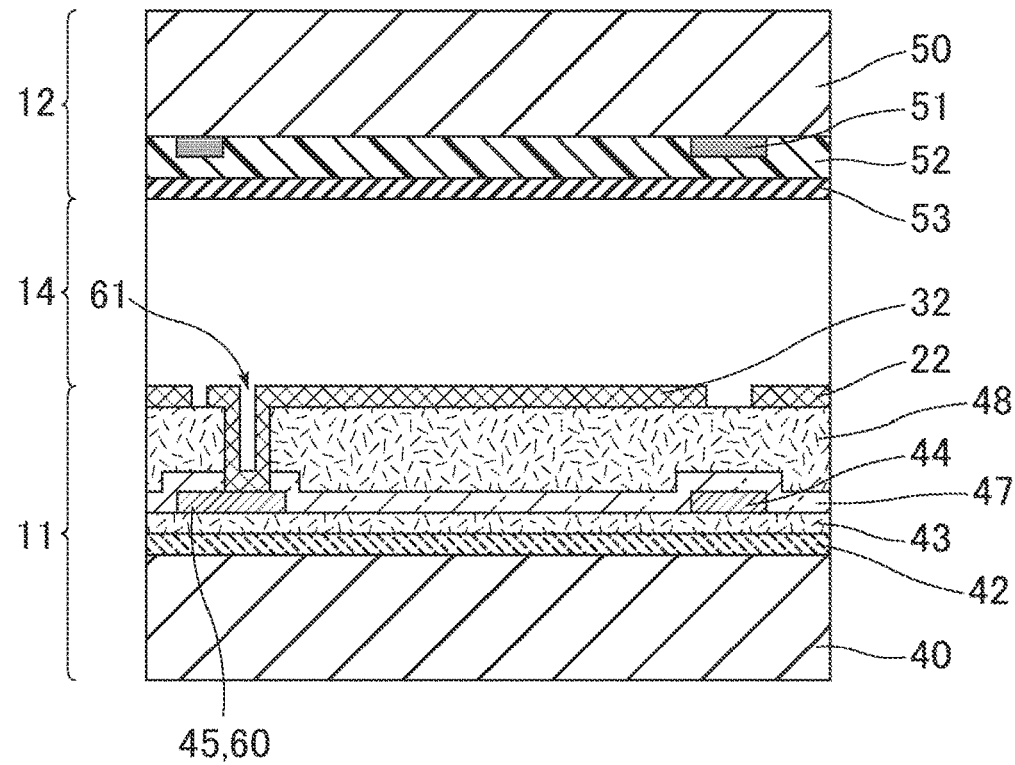
FIG. 8 is a schematic cross-sectional view taken along line B-B shown in FIG. 7.
Figure 9:
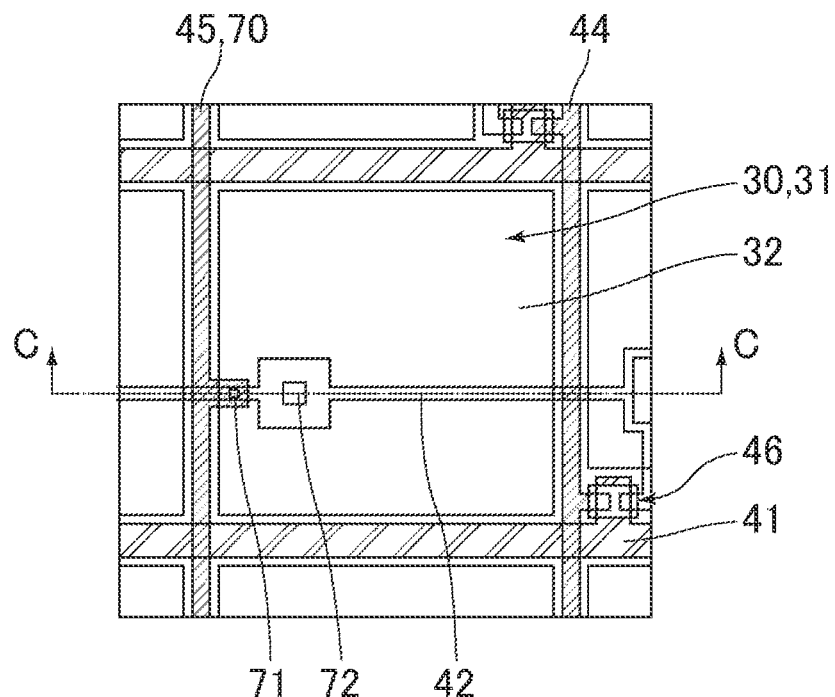
FIG. 9 is an enlarged schematic plan view of a structure of a second region in a liquid crystal display device in accordance with Variation Example 2 of Embodiment 1.
Figure 10:
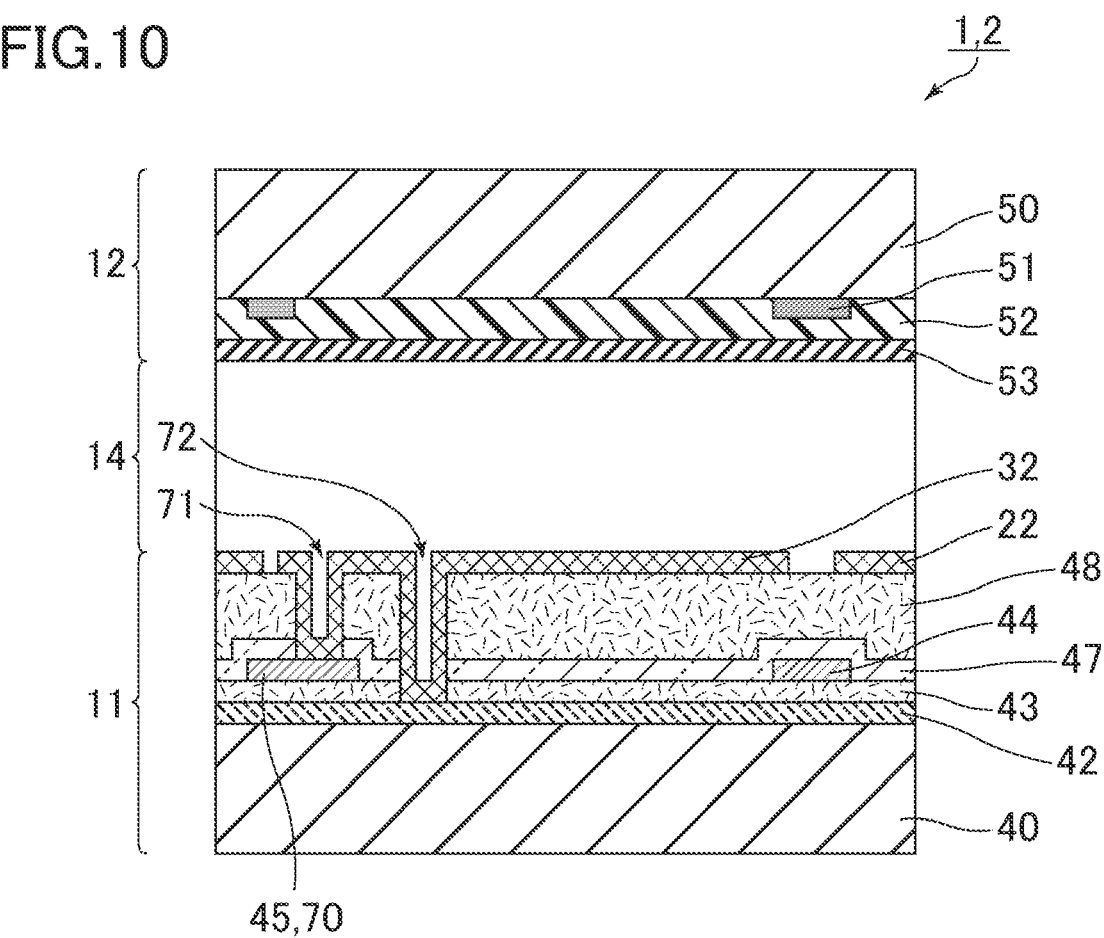
FIG. 10 is a schematic cross-sectional view taken along line C-C shown in FIG. 9.

The dummy data lines 45 may be arranged as in, for example, Variation Example 1 (FIG. 7) and Variation Example 2 (FIG. 9). FIG. 7 is an enlarged schematic plan view of a structure of a second region in a liquid crystal display device in accordance with Variation Example 1 of Embodiment 1. FIG. 8 is a schematic cross-sectional view taken along line B-B shown in FIG. 7. FIG. 9 is an enlarged schematic plan view of a structure of a second region in a liquid crystal display device in accordance with Variation Example 2 of Embodiment 1. FIG. 10 is a schematic cross-sectional view taken along line C-C shown in FIG. 9.

In Variation Example 1, the dummy data line 45 serves as a common signal line 60 and is connected to the second pixel electrode 32 via a contact hole 61 that runs through the inorganic insulation film 47 and the organic insulation film 48, as shown in FIGS. 7 and 8. The second pixel electrode 32 is not connected to the auxiliary capacitor line 42. The common signal line 60 may be supplied with a different signal than is the auxiliary capacitor line 42. Variation Example 1 is the same as the structure shown in FIG. 5 in that a display is produced with a maximum transmittance when the common signal line 60 is supplied with a signal (COM signal) of substantially the same potential as is the opposite electrode 53, but differs from the structure shown in FIG. 5 in that in Variation Example 1, the common signal line 60 may be placed at a different potential than is the opposite electrode 53. For instance, the common signal line 60 may be supplied with a signal for the lowest gray level, so that the entire active area 2a can appear black (allowing no transmission of light). The common signal line 60 may be a single line. Alternatively, the second pixels 31 (second regions 30) may be divided into two or more groups, and there may be provided a plurality of common signal lines 60, one for each group.

The common signal line 60 is connected to, for example, the source driver 15. In this particular structure, the common signal line 60 may be supplied with, for example, a signal of any potential from the source driver 15. Additionally, any AC voltage may be applied across the liquid crystal (the polarity may be alternated between positive and negative from one frame to the other). The structure can hence increase material stability, thereby enhancing reliability.

In Variation Example 2, the dummy data line 45 serves as a second auxiliary capacitor line (Cs signal line) 70, and the second pixel electrode 32 is connected to the auxiliary capacitor lines 70 and 42 via a contact hole 71 that runs through the inorganic insulation film 47 and the organic insulation film 48 and a contact hole 72 that runs through the gate insulation film 43, the inorganic insulation film 47, and the organic insulation film 48, as shown in FIGS. 9 and 10. This particular structure allows for reducing in width, or eliminating altogether, the auxiliary capacitor main lines to be located to the left and right of the active area 2a (Cs main lines; wiring for supplying signals to the auxiliary capacitor lines 70 and 42). The structure hence allows for narrowing down the frame of the liquid crystal display device 1.

The description has so far discussed the structure where those TFTs 46 associated with two adjacent columns of pixels are connected to the same one of the data lines 44 and the dummy data lines 45 reside in those parts of the gap separating the two adjacent columns of pixels where there exists no data line 44. Alternatively, those TFTs 46 associated with two adjacent rows of pixels may be connected to the same one of the scan lines 41 (one of the scan lines 41 flanked by these two rows of pixels), and dummy scan lines that have functions equivalent to those of the dummy data lines 45 may be provided in those parts of the gap separating the two adjacent rows of pixels where there exists no scan line 41. The following will describe this structure (Variation Examples 3 to 5) in detail, focusing on the unique features of the structure.

Figure 11:
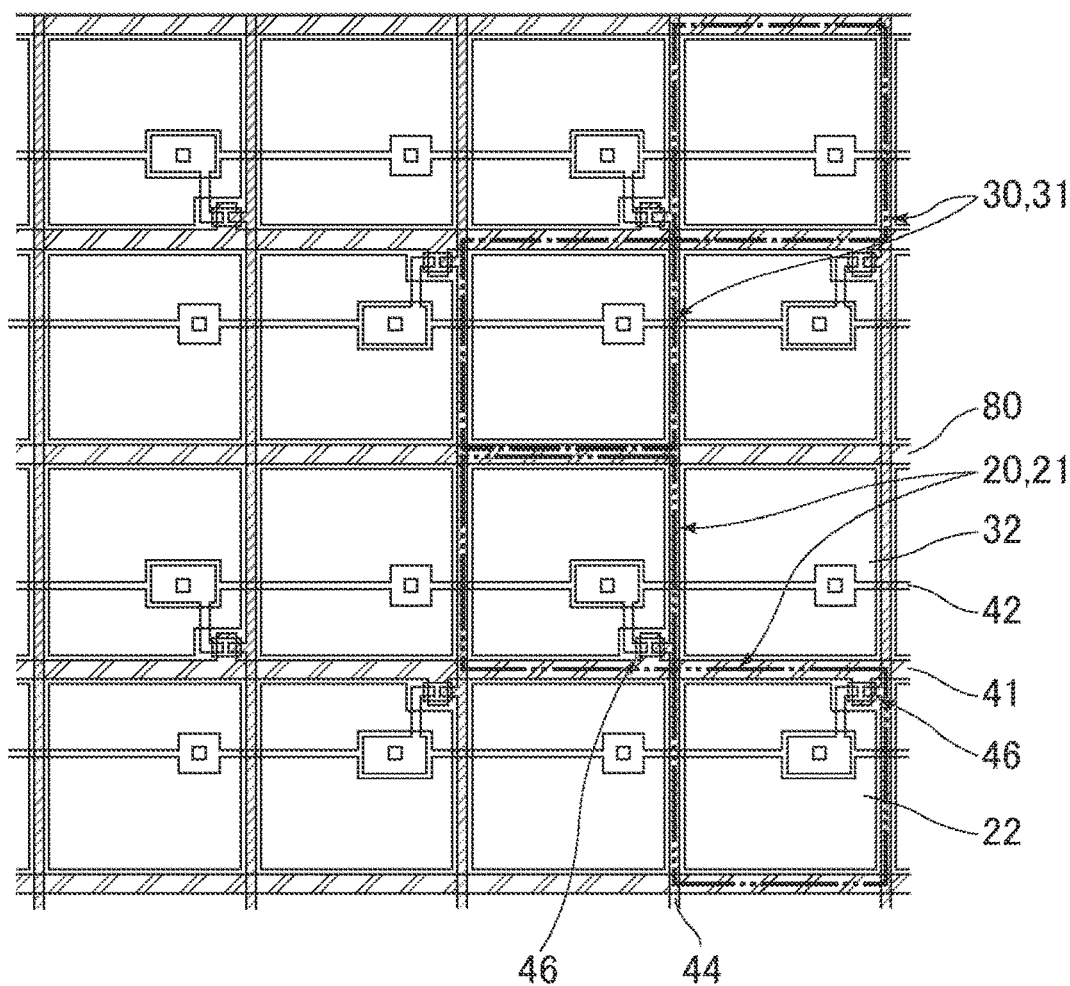
FIG. 11 is an enlarged schematic plan view of a structure of an active area of a liquid crystal display device in accordance with Variation Example 3 of Embodiment 1.
Figure 12:
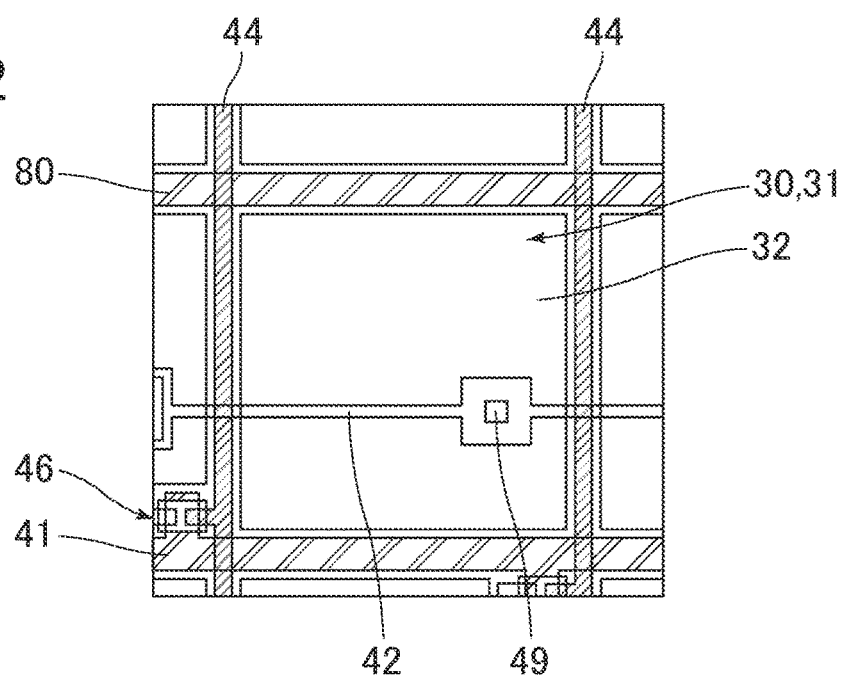
FIG. 12 is an enlarged schematic plan view of a structure of a second region in the liquid crystal display device in accordance with Variation Example 3 of Embodiment 1.

FIG. 11 is an enlarged schematic plan view of a structure of an active area of a liquid crystal display device in accordance with Variation Example 3 of Embodiment 1. FIG. 12 is an enlarged schematic plan view of a structure of a second region in the liquid crystal display device in accordance with Variation Example 3 of Embodiment 1. Referring to FIGS. 11 and 12, in Variation Example 3, the array substrate 11 includes the plurality of scan lines 41, a plurality of dummy scan lines 80, the auxiliary capacitor lines (Cs signal lines) 42, and the plurality of data lines 44 in the active area 2a on the transparent substrate 40. The scan lines 41, the dummy scan lines 80, and the auxiliary capacitor lines (Cs signal lines) 42 extend parallel to each other in the row direction. The data lines 44 extend parallel to each other in a direction that intersects with the scan lines 41, the dummy scan lines 80, and the auxiliary capacitor lines 42 (column direction) via the gate insulation film 43. The scan lines 41 and the dummy scan lines 80 alternate with each other when traced along the column direction. The auxiliary capacitor lines 42 reside in the regions between those adjacent scan lines 41 and dummy scan lines 80. The scan lines 41, the dummy scan lines 80, and the data lines 44 are arranged generally like a lattice so as to segment the active area 2a into squares. The first regions 20 (first pixels 21) and the second regions 30 (second pixels 31) are disposed in these line-segmented regions to form a checkered pattern. In other words, the scan lines 41 and the dummy scan lines 80 reside between column-wise adjacent pixels, the data lines 44 reside between row-wise adjacent pixels. The data lines 44 are arranged with the same pitch as the pixels when traced along the row direction. In contrast, the scan lines 41 and the dummy scan lines 80 are arranged with twice as large a pitch as the pixels when traced along the column direction. The first pixels 21 (first regions 20) include the TFTs 46 near the intersections of the scan lines 41 and the data lines 44, similarly to the above-described structure. The dummy scan lines 80 extend in the same layer as, and parallel to, the scan lines 41 in the active area 2a. The dummy scan lines 80 are supplied with different signals from the scan signals that are supplied to the scan lines 41.

The dummy scan lines 80 are metal wiring made of a metal material. The scan lines 41 and the dummy scan lines 80 may be formed simultaneously by patterning a common metal film by photolithography. When the auxiliary capacitor lines 42 are metal wiring, the scan lines 41, the dummy scan lines 80, and the auxiliary capacitor lines 42 may be formed simultaneously by patterning a common metal film by photolithography.

In the present variation example, the the second pixel 31 (second region 30) again includes no TFT as shown in FIGS. 11 and 12. The second pixel electrode 32, which is a transparent electrode, and the auxiliary capacitor line 42 are connected to each other via the contact hole 49 that runs through the gate insulation film 43, the inorganic insulation film 47, and the organic insulation film 48. Since the second pixels 31 (second regions 30) with a high aperture ratio (high transmittance) are arranged in a checkered pattern, the objects and scenery behind the liquid crystal display device 1 are visually recognizable more easily. In addition, since the alignment of the liquid crystal layer 14 is not changed in the second pixels 31, the transmittance can be restrained from decreasing due to the response speed of the liquid crystal.

The TFTs 46 in the first pixels 21 (first regions 20) are staggered in the present variation example, so that those TFTs 46 associated with two adjacent rows of pixels can be connected to the same one of the scan lines 41 (one of the scan lines 41 flanked by these two rows of pixels). Accordingly, there exists no scan line 41 in parts of the gap separating the two adjacent rows of pixels. The dummy scan line 80 may be provided in those parts where there exists no scan line 41 as described above. The parts may include wiring that has different functions than does the scan line 41.

This particular structure can increase the aperture ratio of the first pixels 21 (first regions 20) and the second pixels 31 (second regions 30) over the structure where the second pixels 31 (second regions 30) are simply provided in specific regions (where the scan line 41 resides in all the gaps separating adjacent rows of pixels).

The dummy scan lines 80 are provided for the purpose of, for example, regulating parasitic capacitance in the pixels and shielding the gap separating adjacent pixel electrodes from light.

Figure 13:
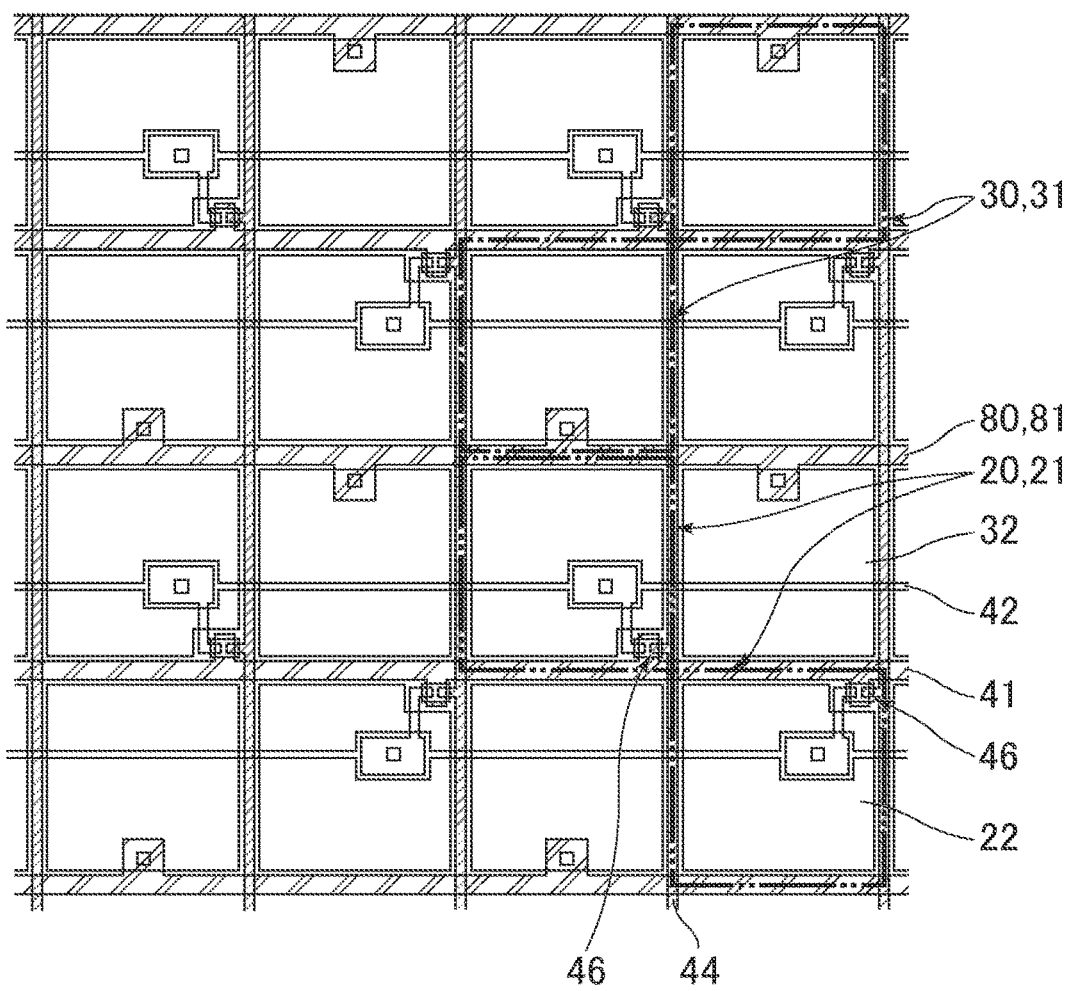
FIG. 13 is an enlarged schematic plan view of a structure of an active area of a liquid crystal display device in accordance with Variation Example 4 of Embodiment 1.
Figure 14:
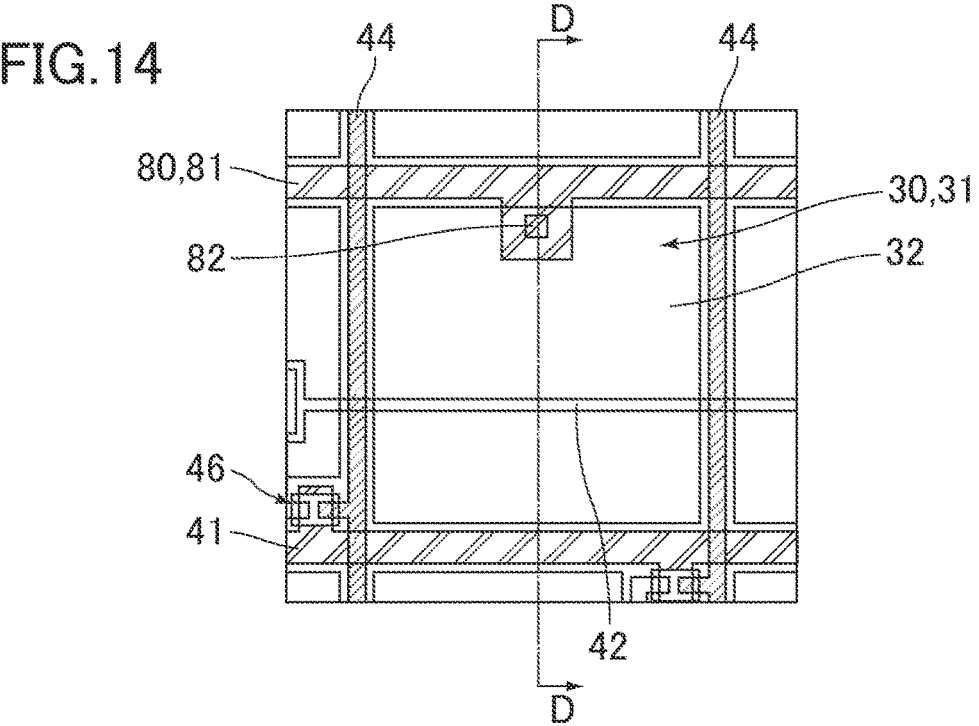
FIG. 14 is an enlarged schematic plan view of a structure of a second region in the liquid crystal display device in accordance with Variation Example 4 of Embodiment 1.
Figure 15:
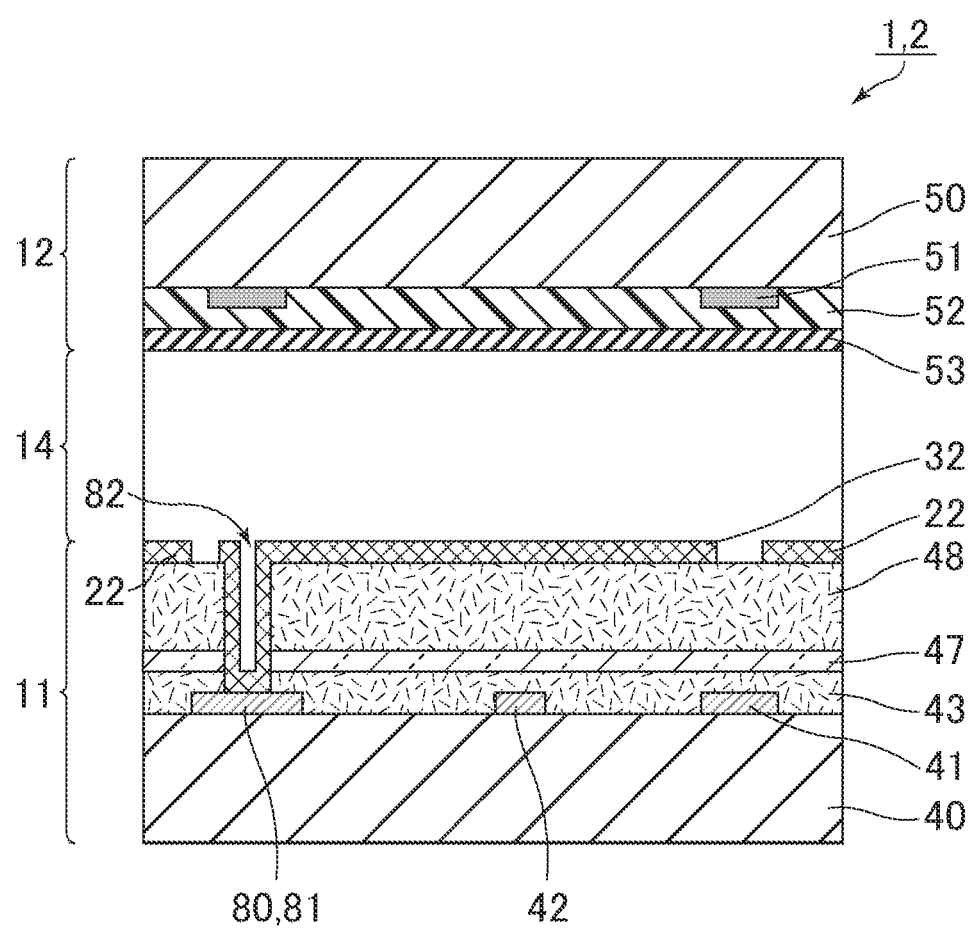
FIG. 15 is a schematic cross-sectional view taken along line D-D shown in FIG. 14.
Figure 16:
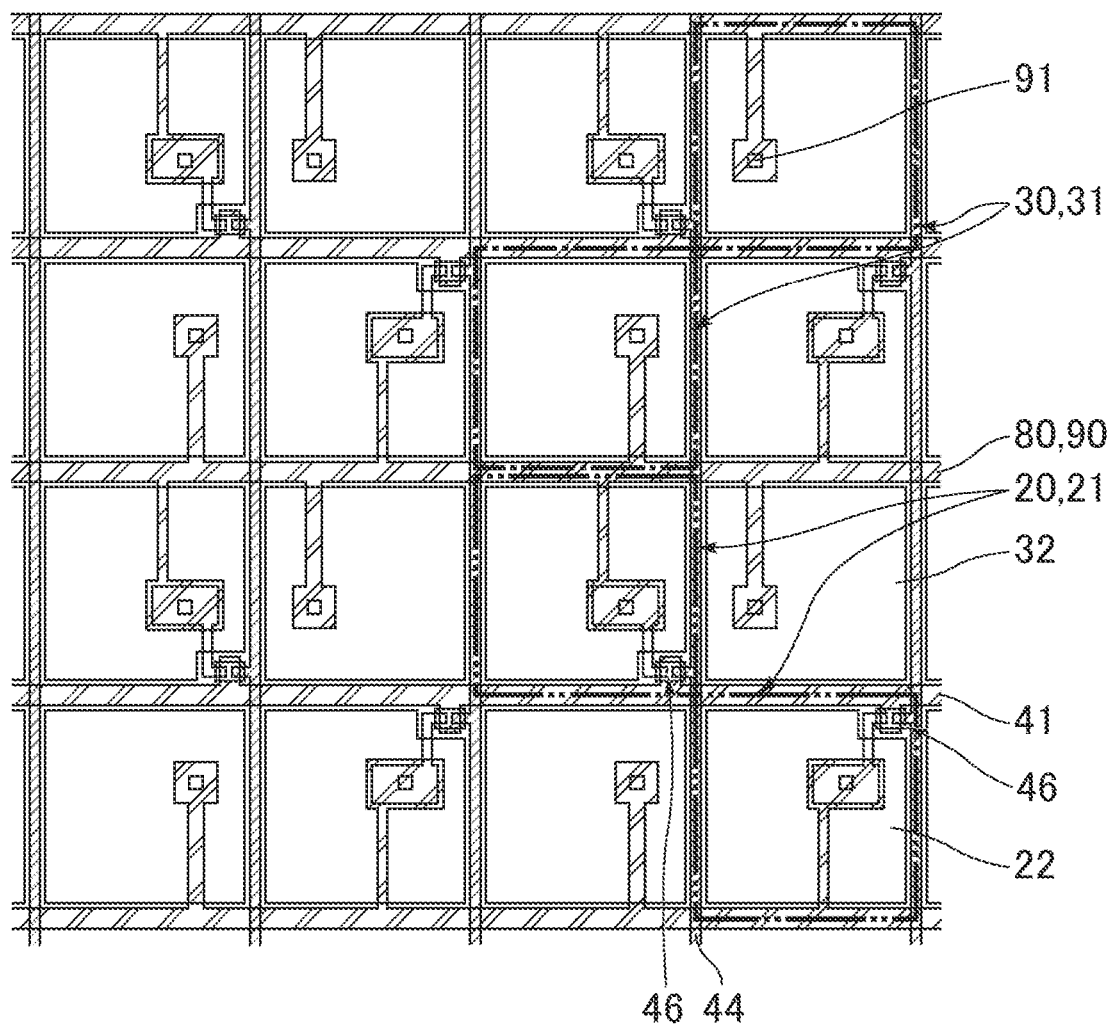
FIG. 16 is an enlarged schematic plan view of a structure of an active area of a liquid crystal display device in accordance with Variation Example 5 of Embodiment 1.

The dummy scan lines 80 may be arranged as in, for example, Variation Example 4 (FIG. 13) and Variation Example 5 (FIG. 16). FIG. 13 is an enlarged schematic plan view of a structure of an active area of a liquid crystal display device in accordance with Variation Example 4 of Embodiment 1. FIG. 14 is an enlarged schematic plan view of a structure of a second region in the liquid crystal display device in accordance with Variation Example 4 of Embodiment 1. FIG. 15 is a schematic cross-sectional view taken along line D-D shown in FIG. 14. FIG. 16 is an enlarged schematic plan view of a structure of an active area of a liquid crystal display device in accordance with Variation Example 5 of Embodiment 1.

In Variation Example 4, the dummy scan line 80 serves as a common signal line 81 and is connected to the second pixel electrode 32 via a contact hole 82 that runs through the inorganic insulation film 47 and the organic insulation film 48, as shown in FIGS. 13 to 15. The second pixel electrode 32 is not connected to the auxiliary capacitor line 42. The common signal line 81 may be supplied with a different signal than is the auxiliary capacitor line 42. Variation Example 4 is the same as the structure of Variation Example 3 in that a display is produced with a maximum transmittance when the common signal line 81 is supplied with a signal (COM signal) of substantially the same potential as is the opposite electrode 53, but differs from the structure of Variation Example 3 in that in Variation Example 4, the common signal line 81 may be placed at a different potential than is the opposite electrode 53. For instance, the common signal line 81 may be supplied with a signal for the lowest gray level, so that the entire active area 2a can appear black (allowing no transmission of light). The common signal line 81 may be a single line. Alternatively, the second pixels 31 (second regions 30) may be divided into two or more groups, and there may be provided a plurality of common signal lines 81, one for each group.

The common signal line 81 is connected to, for example, either the source driver 15 or one of the gate drivers 16. In this particular structure, the common signal line 81 can be supplied with, for example, a signal of any potential from the source driver 15 or one of the gate drivers 16. Additionally, any AC voltage may be applied across the liquid crystal (the polarity may be alternated between positive and negative from one frame to the other). The structure can hence increase material stability, thereby enhancing reliability.

In Variation Example 5, the dummy scan line 80 serves as an auxiliary capacitor line (Cs signal line) 90, and the second pixel electrode 32 is connected to the auxiliary capacitor line 90 via a contact hole 91 that runs through the inorganic insulation film 47 and the organic insulation film 48, as shown in FIG. 16. In addition, the auxiliary capacitor line 90 branches off so as to overlap the drain electrode of the TFT 46. This particular structure can eliminate the auxiliary capacitor lines 42, thereby increasing the aperture ratio of the first pixels 21 (first regions 20) and the second pixels 31 (second regions 30).

The signal on the auxiliary capacitor line 90 is a DC signal supplied from, for example, an external source. The signal on the auxiliary capacitor line 90 is preferably set to such a fixed potential that the second pixel 31 appears white in normally white mode and black in normally black mode in the absence of applied voltage. The auxiliary capacitor line 90 is preferably supplied with a signal (COM signal) of substantially the same potential as is the opposite electrode 53. When this is the case, the auxiliary capacitor line 90 may be connected to a terminal section in the top layer of the array substrate 11, and this terminal section may be connected to the opposite electrode 53 on the opposite substrate 12 via, for example, a conduction member such as gold particles contained in the sealing 13, so that the auxiliary capacitor line 90 and the opposite electrode 53 can be supplied with a COM signal from an external source.

When the opposite electrode 53 is provided on the array substrate 11, the second pixel electrode 32 may be connected to the auxiliary capacitor line 90 via a transparent contact electrode that is provided in the same layer as the opposite electrode 53 and made of a transparent conductive material.

The liquid crystal display device 1 can be used in a variety of applications. Suitable examples include those applications where the see-through display device is preferred, including vehicle windows, signage, mobile information terminals, camera viewfinders, game consoles, and shop windows.

As described so far, the liquid crystal display device 1 in accordance with the present embodiment includes: an array substrate (first substrate) 11; an opposite substrate (second substrate) 12 opposite the array substrate 11; a liquid crystal layer 14 between the array substrate 11 and the opposite substrate 12; and an active area 2a including: a matrix of first regions 20 (first pixels 21); and a plurality of second regions 30 (second pixels 31) distributed so as not to overlap the first regions 20, wherein each first region 20 includes a TFT 46 (switching element) and is supplied with a grayscale signal via the TFT 46, and the plurality of second regions 30 includes no switching element and is supplied with a common signal. This particular structure enables the first regions 20 to produce a display and at the same time enables the second regions 30 to have a high aperture ratio and exhibit a high transmittance. The structure hence enables the liquid crystal display device 1 to serve as a see-through display device that has such a high aperture ratio that the viewer can easily see through the liquid crystal display device 1.

In the liquid crystal display device 1 in accordance with the present embodiment, each first region 20 (first pixel 21) may include a pixel electrode (first pixel electrode) 22 connected to the TFT 46 (switching element) in that first region 20, each of the plurality of second regions 30 (second pixel 31) may include a transparent electrode (second pixel electrode) 32, and the liquid crystal display device may further include: an opposite electrode 53 opposite the pixel electrodes 22 and the transparent electrodes 32; a plurality of data lines 44 extending in a column direction and connected to the respective TFTs 46 to supply a grayscale signal to the first regions 20; a plurality of scan lines 41 extending in a row direction and connected to the respective TFTs 46; and a plurality of auxiliary capacitor lines (Cs signal lines) 42 extending in the row direction and supplied with a signal of a substantially same potential as the opposite electrode 53. The liquid crystal display device 1 can hence more suitably serve as a high-transmittance, see-through display device.

In the present embodiment, each of the plurality of auxiliary capacitor lines (Cs signal lines) 42 may overlap at least one of the first regions 20 (first pixels 21) and at least one of the plurality of second regions 30 (second pixels 31) (preferably those first regions 20 and second regions 30 which reside in the same row), and the plurality of auxiliary capacitor lines 42 may occupy a smaller area in those of the plurality of second regions 30 which are overlapped by the plurality of auxiliary capacitor lines 42 than the plurality of auxiliary capacitor lines 42 occupies an area in those first regions 20 which are overlapped by the plurality of auxiliary capacitor lines 42. This particular structure can further improve the aperture ratio and transmittance of the second regions 30, thereby permitting the viewer to more easily see through the liquid crystal display device 1.

In in the present embodiment, each transparent electrode (second pixel electrode) 32 may be connected to an auxiliary capacitor line (Cs signal line) 42 via no switching element. This particular structure enables supplying a signal (COM signal) of substantially the same potential to the transparent electrodes 32 via the auxiliary capacitor lines 42 as to the opposite electrode 53. The liquid crystal layer 14 therefore does not change the alignment thereof in the second regions 30 in normally white mode, so that light can pass through the liquid crystal layer 14. The structure can hence further improve the transmittance of the second regions 30, thereby permitting the viewer to more easily see through the liquid crystal display device 1.

In the present embodiment, the first regions 20 (first pixels 21) may be staggered, and those TFTs 46 (switching elements) which are associated with those first regions 20 which reside in two adjacent columns may be connected to one of the plurality of data lines 44. This particular structure allows for reducing in width, or eliminating altogether, the dummy data lines residing in the gap between two adjacent columns of first regions 20 where there are provided no data lines 44. The structure can hence further contribute to increasing the aperture ratio of the regions 20 and 30.

The liquid crystal display device 1 in accordance with the present embodiment may further include a plurality of dummy data lines 45 extending in the column direction, wherein the plurality of data lines 44 and the plurality of dummy data lines 45 alternate when traced along the row direction. This particular structure allows for the regulation of parasitic capacitance in the pixels and the shielding from light of the gap between adjacent pixel electrodes.

In the present embodiment, the transparent electrode (second pixel electrode) 32 may be connected to the auxiliary capacitor line (Cs signal line) 42 and the dummy data line 45 via no switching element. In this particular structure, the dummy data lines 45 may serve as the second auxiliary capacitor lines (Cs signal lines) 70, so that the COM signal can be supplied not only to the auxiliary capacitor lines 42, but also to the dummy data lines 45. The structure hence allows for reducing in width, or eliminating altogether, the auxiliary capacitor main lines to be located to the left and right of the active area 2a, thereby enabling a narrow frame design for the liquid crystal display device 1.

In the present embodiment, the first regions 20 (first pixels 21) may be staggered, those TFTs 46 (switching elements) which are associated with those first regions 20 which reside in two adjacent columns may be connected to one of the plurality of data lines 44, the liquid crystal display device 1 in accordance with the present embodiment may further include a plurality of dummy data lines 45 extending in the column direction, the plurality of data lines 44 and the plurality of dummy data lines 45 alternate when traced along the row direction, and the transparent electrode (second pixel electrode) 32 may be connected to none of the plurality of auxiliary capacitor lines (Cs signal lines) 42 and to the dummy data line 45 via no switching element. In this particular structure, the dummy data lines 45 may serve as the common signal line 60. The structure hence enables different signals to be supplied to the common signal line 60 and the auxiliary capacitor lines 42, for example, such that the entire active area 2a can appear black (allowing no transmission of light).

In the present embodiment, the first regions 20 (first pixels 21) may be staggered, and those TFTs 46 (switching elements) which are associated with those first regions 20 which reside in two adjacent rows may be connected to one of the plurality of scan lines 41. This particular structure allows for reducing in width, or eliminating altogether, the dummy scan lines 80 in the gap between two adjacent rows of first regions 20 where there are provided no scan lines 41. The structure can hence further contribute to increasing the aperture ratio of the regions 20 and 30.

The liquid crystal display device 1 in accordance with the present embodiment may further include a plurality of dummy scan lines 80 extending in the row direction, wherein the plurality of scan lines 41 and the plurality of dummy scan lines 80 alternate when traced along the row direction. This particular structure allows for the regulation of parasitic capacitance in the pixels and the shielding from light of the gap between adjacent pixel electrodes.

In the present embodiment, the transparent electrode (second pixel electrode) 32 may be connected to the auxiliary capacitor line 90 (dummy scan line 80) via no switching element. This particular structure allows for eliminating the auxiliary capacitor lines 42, thereby contributing to increasing the aperture ratio of the regions 20 and 30.

In the present embodiment, the first regions 20 (first pixels 21) may be staggered, those TFTs 46 (switching elements) which are associated with those first regions 20 which reside in two adjacent rows may be connected to one of the plurality of scan lines 41, the liquid crystal display device 1 in accordance with the present embodiment may further include a plurality of dummy scan lines 80 extending in the row direction, the plurality of scan lines 41 and the plurality of dummy scan lines 80 alternate when traced along the row direction, and the transparent electrode (second pixel electrode) 32 may be connected to none of the plurality of auxiliary capacitor lines (Cs signal lines) 42 and to the dummy scan line 80 via no switching element. In this particular structure, the dummy scan lines 80 can serve as the common signal line 81. The structure hence enables different signals to be supplied to the common signal line 81 and the auxiliary capacitor lines 42, for example, such that the entire active area 2a can appear black (allowing no transmission of light).

The present embodiment is suitable when the liquid crystal display device operates in normally white mode. The entire active area 2a, in normally white mode, appears white (maximum transmittance) all the time in the absence of applied voltage across the liquid crystal layer 14. The structure hence improves transmittance, enabling the liquid crystal display device 1 to more suitably serve as a see-through display device.

The present embodiment is also suitable when the liquid crystal display device operates in normally black mode. In this particular structure, the liquid crystal display device 1 is suitable for such applications where the background scenery of the liquid crystal display device 1 should be hidden except in specific time periods (e.g., curtains and window shades).

The display system 100 in accordance with the present embodiment includes: the liquid crystal display device 1; and the display device 101 behind the liquid crystal display device 1. The viewer can see through the liquid crystal display device 1, which is a see-through display device, to easily visually recognize the display produced by the display device 101 behind the liquid crystal display device 1.

Since the present embodiment provides a novel structure for the array substrate 11 by eliminating TFTs and scaling down auxiliary capacitor lines for high aperture ratio and hence high transmittance, the present embodiment can also achieve the aforementioned advantages when applied to display devices with no color filters such as field sequential display devices.

While there have been described what are at present considered to be certain embodiments of the application, it will be understood that various modifications may be made thereto, and it is intended that the appended claim cover all such modifications as fall within the true spirit and scope of the application.

What is claimed is:

1. A liquid crystal display device comprising:
a first substrate;
a second substrate opposite the first substrate;
a liquid crystal layer between the first substrate and the second substrate; and
an active area including: a plurality of first regions and a plurality of second regions distributed so as not to overlap the plurality of first regions, wherein
each first region includes a switching element and is supplied with a grayscale signal via the switching element,
each of the plurality of second regions does not include the switching element and is supplied with a common signal,
each first region further includes a pixel electrode connected to a corresponding switching element in the first region, each of the plurality of second regions includes a transparent electrode, and the liquid crystal display device further comprises:
- an opposite electrode opposite the pixel electrodes and the transparent electrodes;
- a plurality of data lines extending in a column direction, each data line connected to a respective switching element of each first region to supply the grayscale signal to the first region;
- a plurality of scan lines extending in a row direction, each scan line connected to a respective switching element of each first region; and
- a plurality of auxiliary capacitor lines supplied with a signal of a substantially same potential as a potential of the opposite electrode.

2. The liquid crystal display device according to claim 1, wherein
the plurality of auxiliary capacitor lines extends in the row direction.

3. The liquid crystal display device according to claim 1, wherein
- each of the plurality of auxiliary capacitor lines overlaps at least one of the plurality of first regions and at least one of the plurality of second regions,
- the plurality of auxiliary capacitor lines overlaps the plurality of second regions and occupies a first area in the plurality of second regions,
- the plurality of auxiliary capacitor lines overlaps the plurality of first regions and occupies a second area in the plurality of first regions, and
- the first area is smaller than the second area.

4. The liquid crystal display device according to claim 1, wherein each transparent electrode is connected to at least one of the plurality of auxiliary capacitor lines without any switching element.

5. The liquid crystal display device according to claim 1, wherein
- the plurality of first regions are staggered, and
- a plurality of the switching elements associated with the corresponding first regions, which reside in two adjacent columns, are connected to one of the plurality of data lines.

6. The liquid crystal display device according to claim 5, further comprising a plurality of dummy data lines extending in the column direction, wherein the plurality of data lines and the plurality of dummy data lines alternate when traced along the row direction.

7. The liquid crystal display device according to claim 6, wherein each transparent electrode is connected to at least one of the plurality of auxiliary capacitor lines and at least one of the plurality of dummy data lines without any switching element.

8. The liquid crystal display device according to claim 1, wherein
the plurality of first regions are staggered,
a plurality of the switching elements associated with the corresponding first regions, which reside in two adjacent columns, are connected to one of the plurality of data lines,
the liquid crystal display device further comprises a plurality of dummy data lines extending in the column direction,
the plurality of data lines and the plurality of dummy data lines alternate when traced along the row direction, and
each transparent electrode is connected to none of the plurality of auxiliary capacitor lines and to at least one of the plurality of dummy data lines without any switching element.

9. The liquid crystal display device according to claim 1, wherein
the plurality of first regions are staggered, and
a plurality of the switching elements associated with the corresponding first regions, which reside in two adjacent rows, are connected to one of the plurality of scan lines.

10. The liquid crystal display device according to claim 9, further comprising a plurality of dummy scan lines extending in the row direction, wherein the plurality of scan lines and the plurality of dummy scan lines alternate when traced along the column direction.

11. The liquid crystal display device according to claim 9, wherein each transparent electrode is connected to at least one of the plurality of auxiliary capacitor lines without any switching element.

12. The liquid crystal display device according to claim 1, wherein
the plurality of first regions are staggered,
a plurality of the switching elements associated with the corresponding first regions, which reside in two adjacent rows, are connected to one of the plurality of scan lines,
the liquid crystal display device further comprises a plurality of dummy scan lines extending in the row direction,
the plurality of scan lines and the plurality of dummy scan lines alternate when traced along the column direction, and
each transparent electrode is connected to none of the plurality of auxiliary capacitor lines and to at least one of the plurality of dummy scan lines without any switching element.

13. The liquid crystal display device according to claim 1, wherein the liquid crystal display device operates in a normally white mode.

14. The liquid crystal display device according to claim 1, wherein the liquid crystal display device operates in a normally black mode.

15. A display system comprising:
the liquid crystal display device according to claim 1; and
a display device behind the liquid crystal display device.

* * * * *